United States Patent
Sgroi et al.

(10) Patent No.: US 11,940,963 B2
(45) Date of Patent: Mar. 26, 2024

(54) MECHANISMS FOR HANDLING SCHEMA CHANGES

(71) Applicant: salesforce.com, inc., San Francisco, CA (US)

(72) Inventors: Michael Sgroi, San Francisco, CA (US); Helen Kwong, Palo Alto, CA (US); Benjamin Busjaeger, San Carlos, CA (US); Igor Fedorenko, Toronto (CA)

(73) Assignee: Salesforce, Inc., San Francisco, CA (US)

( * ) Notice: Subject to any disclaimer, the term of this patent is extended or adjusted under 35 U.S.C. 154(b) by 100 days.

(21) Appl. No.: 17/457,244

(22) Filed: Dec. 1, 2021

(65) Prior Publication Data
US 2023/0169049 A1 Jun. 1, 2023

(51) Int. Cl.
G06F 16/21 (2019.01)
G06F 16/22 (2019.01)
G06F 16/23 (2019.01)
G06F 16/2455 (2019.01)

(52) U.S. Cl.
CPC ........ G06F 16/213 (2019.01); G06F 16/2282 (2019.01); G06F 16/2358 (2019.01); G06F 16/24552 (2019.01)

(58) Field of Classification Search
None
See application file for complete search history.

(56) References Cited

U.S. PATENT DOCUMENTS

| | | | |
|---|---|---|---|
| 6,951,013 B1 * | 9/2005 | Lozins | G06F 16/284 717/113 |
| 9,122,716 B1 * | 9/2015 | Naganathan | G06F 16/2471 |
| 10,719,533 B2 | 7/2020 | Busjaeger et al. | |
| 10,909,091 B1 | 2/2021 | Shah et al. | |
| 11,126,625 B2 | 9/2021 | Busjaeger et al. | |
| 11,157,466 B2 | 10/2021 | Busjaeger et al. | |
| 2016/0246821 A1 * | 8/2016 | Meder | G06F 16/214 |

(Continued)

OTHER PUBLICATIONS

Rae et al., "Online, Asynchronous Schema Change in F1," Proceedings of the VLDB Endowment, vol. 6, Issue 11, Aug. 2013, pp. 1045-1056.

(Continued)

*Primary Examiner* — Richard L Bowen
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to database schemas. A computer system may receive a metadata document that describes an updated schema for a database that stores a plurality of records. The computer system may instantiate a set of processes to perform an upgrade routine to upgrade ones of the plurality of records to comply with the updated schema. While the set of processes are upgrading the records, the computer system may receive a request to perform an operation on one of the plurality of records. The computer system may detect that the record corresponds to an earlier schema version than a version of the updated schema of the metadata document and may upgrade the record to comply with that updated schema. After upgrading the record, the computer system may perform the requested operation on the record.

16 Claims, 9 Drawing Sheets

(56) References Cited

U.S. PATENT DOCUMENTS

| | | | | |
|---|---|---|---|---|
| 2021/0109922 A1* | 4/2021 | Mahadik | ............... | G06F 3/0647 |
| 2022/0083502 A1* | 3/2022 | Bestfleisch | ........... | G06F 16/901 |
| 2022/0171748 A1* | 6/2022 | Bamel | ................. | G06F 11/1464 |
| 2023/0047056 A1* | 2/2023 | Chang | ................... | G06F 3/0671 |

OTHER PUBLICATIONS

International Search Report and Written Opinion in PCT Appl. No. PCT/US2022/079463 dated Feb. 22, 2023, 13 pages.

Bhattacherjee et al., "BullFrog: Online Schema Evolution via Lazy Evaluation," Research Data Management Track Paper, SIGMOD '21 Jun. 20-25, 2021, Virtual Event, China, pp. 194-205.

Neamtiu et al., "Improving Cloud Availability with On-the-fly Schema Updates," The 19th International Conference on Management of Data, Dec. 19-21, 2013, 11 pages.

Hillenbrand et al., "Towards Self-Adapting Data Migration in the Context of Schema Evolution in NoSQL Databases," 2020 IEEE 36th International Conference on Data Engineering Workshops, pp. 133-138.

* cited by examiner

MECHANISMS FOR HANDLING SCHEMA CHANGES

BACKGROUND

Technical Field

This disclosure relates generally to database systems and, more specifically, to various mechanisms for allowing changes to a metadata document without causing a database service to be brought down.

Description of the Related Art

Enterprises routinely implement database management systems (or, simply "database systems") that enable users to store a collection of information in an organized manner that can be efficiently accessed and manipulated. In some cases, a database system implements a key-value database that stores information as a collection of key-value pairs, in which a key serves as a unique identifier for accessing its associated value. During operation, the database system receives requests from users via applications or from other systems, such as another database system, to perform transactions on the information stored in that key-value database. As such, the database system uses keys that are specified in those requests to read information out from the database and/or write information back to the database.

DETAILED DESCRIPTION

Figure 1:
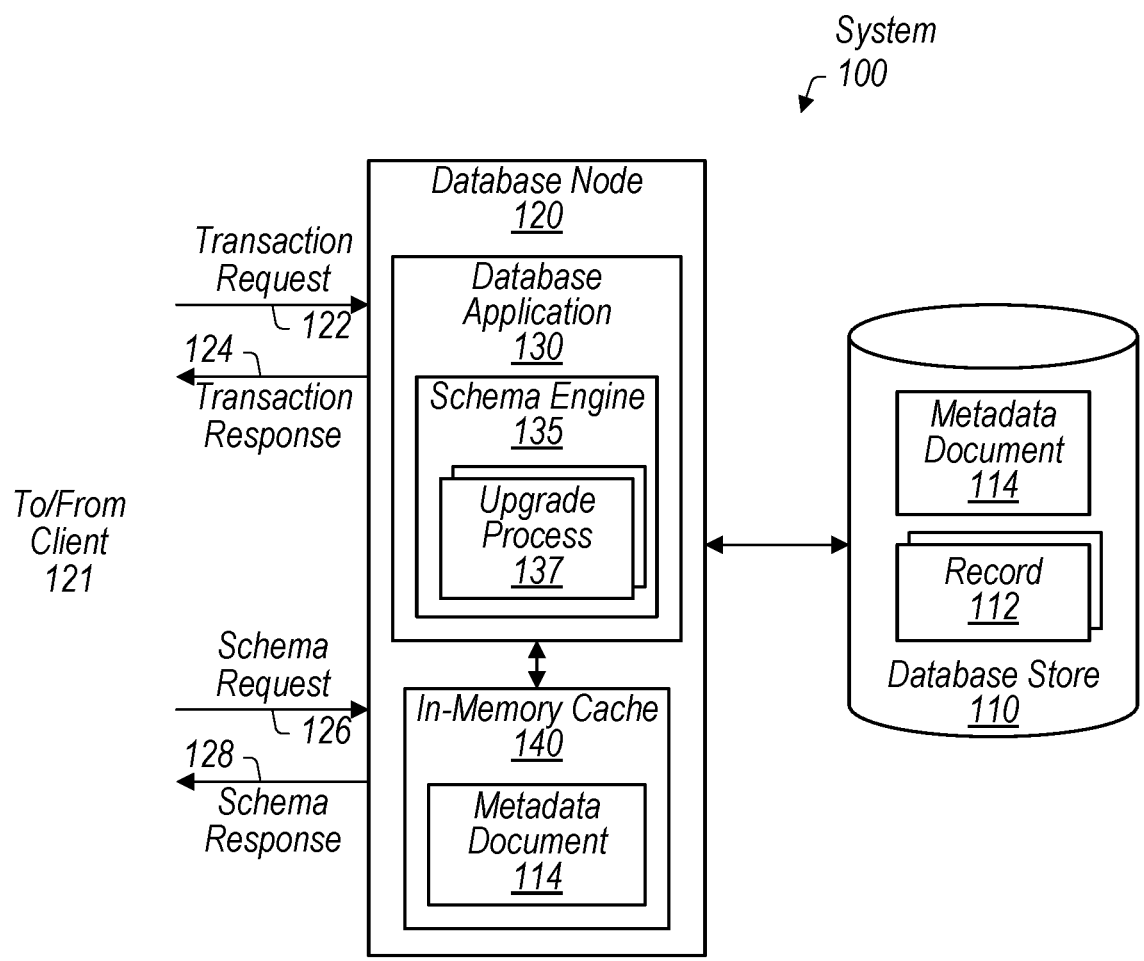
FIG. 1 is a block diagram illustrating example elements of a system having a database store and a database node, according to some embodiments.

A database system may implement a key-value database that stores data as a collection of key-value pairs. That key-value database typically provides little or no support for checking or enforcing rules on what data can be written to the database. For example, the database may not support "strongly typed" schemas that define the types and structures of data that is allowed to be written to the database. As a result, without enforcement of a strongly typed schema, an application may write data into the database and then another application may access that data, expecting it to include certain values or to be formatted a certain way but it may not be so. The other application may thus not be able to correctly operate on that data. Because the database does not provide that support, the responsibility falls on a client/user of the database, not the provider, to ensure that data is structured correctly before its stored and later read out. While this makes a key-value database easier to adopt by the provider of the database system, it places an additional burden on clients to ensure that their data is written in accordance with a schema. In order to reduce this burden placed on clients, it may be desirable to implement a schema management layer that sits overs a key-value database and provides support for strongly typed schemas. It may also be desirable to enable clients to update the schemas without experiencing unreasonable performance degradation. The present disclosure addresses, among other things, the problem of how to implement the schema management layer such that clients/tenants are able to update schemas without their portion of the database being brought down to implement the update.

In various embodiments described below, a computer system includes a database store and a database node that executes processes to service transaction requests from clients of the computer system. The database node may ensure that data is operated on (e.g., accessed, stored, etc.) in accordance with a schema that is described in a metadata document. During operation, the database node may receive a schema update request specifying a metadata document that describes an updated schema. In response to the request, in various embodiments, the database node instantiates a set of upgrade processes that perform an upgrade routine to upgrade data of the database store to comply with the schema. As an example, the updated schema may add a new field to a user table. The upgrade processes may upgrade records of that user table such that those records include a value for the new field. But while those upgrade processes are upgrading records, the database node may receive a request to perform a transaction involving a record of a database entity that is being upgraded. Before performing a requested operation on the record, in various embodiments, the database node determines whether the record's version matches the version of the updated schema—as the record might not have yet been reached by the upgrade processes. If there is a discrepancy between those versions, then the database node performs a set of steps to upgrade the record to comply with the updated schema. Once that record has been upgraded, the database node may perform the requested operation on the record.

The metadata document, in various embodiments, identifies statuses for one or more of the database entities that are described by the schema. While a database entity is being created or upgraded, its status can be set to reflect these processes and, when the creation/upgrade is complete, the status can be updated to indicate that the database entity is ready. In various embodiments, the statuses described in the metadata document can be queried by clients to determine if particular database entities (e.g., an index) are usable. Once a client determines that a database entity is ready, the client may then start to issue transaction requests that utilize that database entity. A transaction request, in some embodiments, may specify a minimum schema version to be used to process the request. As such, when processing the request, the database node may determine if the version of the schema cached in a memory of the database node satisfies the minimum schema version. If the minimum schema version is not satisfied, then, in various embodiments, the database node replaces the cached schema with the schema described in the latest metadata document. A client may therefore use the minimum schema version to force the database node to refresh its cache (if it has not done so already).

These techniques may be advantageous as they allow for a "schema management layer" to be implemented that provides strong typing via a schema that can be updated without unduly affecting clients while records are upgraded to comply with that schema. Consider an example in which a client updates that schema to add a new field to a table. The client may continue to access records of the table while the table is being upgraded as the schema management layer can upgrade records at the time they are requested or manipulated by the client. Thus, the client may not have to wait for the update to be propagated through the table before interacting with the table. Moreover, by tracking the statuses of the different database entities described in the schema, a client can determine if a particular entity, such as a new index, is available for use. Furthermore, the use of a minimum schema version in transaction requests can allow for causal consistency as a client can force a database node to refresh its cache so that it utilizes the latest version when appropriate. An exemplary application of the techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 includes a database store 110 and a database node 120 that interacts with database store 110 and a client 121. As further shown, database store 110 includes records 112 and a metadata document 114, and database node 120 includes a database application 130 and an in-memory cache 140 that is used to cache metadata document 114. Also as shown, database application 130 includes a schema engine 135 that can spawn one or more upgrade processes 137. In some embodiments, system 100 is implemented differently than illustrated. For example, system 100 may include multiple database nodes 120 that collectively implement a database service, database store 110 may store multiple metadata documents 114, and/or multiple clients 121 may interact with database node 120. As another example, metadata documents 114 might be stored at a metadata store separate from database store 110.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases (e.g., database store 110), and entities (e.g., a third-party system) relating to system 100. In various embodiments, system 100 is implemented using a cloud infrastructure provided by a cloud provider. Database store 110 and database node 120 may thus execute on and utilize the available cloud resources of that cloud infrastructure (e.g., computing resources, storage resources, network resources, etc.) to facilitate their operation. For example, database node 120 may execute within a virtual environment hosted on server-based hardware included in a datacenter of the cloud provider. But in some embodiments, system 100 is implemented utilizing a local or private infrastructure as opposed to a public cloud.

Database store 110, in various embodiments, includes a collection of information that is organized in a manner that allows for access, storage, and manipulation of that information. Database store 110 may include supporting software (e.g., storage nodes) that enable database node 120 to carry out those operations (e.g., accessing, storing, etc.) on the information that is stored at database store 110. In various embodiments, database store 110 is implemented using a single or multiple storage devices that are connected together on a network (e.g., a storage attached network (SAN)) and configured to redundantly store information in order to prevent data loss. The storage devices may store data persistently and therefore database store 110 may serve as a persistent storage for system 100. In various embodiments, data written to database store 110 by a database node 120 is accessible to other database nodes 120 within a multi-node configuration.

In various embodiments, data is stored at database store 110 in records 112 structured according to one or more schemas described in metadata document 114. In some cases, system 100 may implement a relational database and thus metadata document 114 may describe tables, views, indexes, relationships, triggers, etc. Accordingly, a record 112 may correspond to a row in a database table and specify values for one or more fields of that table. One or more of the fields may be used to define a key for accessing that record from database store 110. In various cases, system 100 may implement a non-relational database, such as a key-value store, a wide-column store, a document store, etc., and thus metadata document 114 may describe properties and/or constraints of items/records 112 stored at database store 110. For example, a record 112 may be a key-value pair comprising data and a corresponding key that can be used to look up that record 112. Metadata document 114 may thus describe a set of fields for which that record 112 is expected to store values. Accordingly, in various embodiments, metadata document 114 is a monolithic document that describes the organization of data as a blueprint of how database store 110 is to be constructed. An example metadata document 114 is described in more detail with respect to FIG. 2.

Database node 120, in various embodiments, provides various database services, such as data storage, data retrieval, and data manipulation. Database node 120 may be a combination of hardware and software (e.g., database application 130) that is executed on that hardware. In various embodiments, database application 130 is executable to provide the database services of database node 120 to components in system 100 and/or external to system 100. For example, as shown, database node 120 can receive (e.g., via an API, such as Java Database Connectivity) a transaction request 122 from a client 121 (e.g., an application server, a user device, another database node, etc.) to perform a transaction. A database transaction, in various embodiments, is a logical unit of work (e.g., a specified set of database operations) to be performed in relation to database store 110. For example, processing a database transaction might include executing a SELECT command to select a set of rows from a set of tables. The contents of a row may be specified in a record 112 and thus database node 120 may return records 112 corresponding to those rows. As another example, processing a database transaction might include writing a set of documents, in the form of records 112, to a collection stored at database store 110. In some embodiments, database node 120 initially writes records 112 into in-memory cache 140 before later flushing them to database store 110 after they have been committed. As used herein, the phrase "committing a transaction" is used in accordance with its well-understood meaning and refers to the process of causing the changes made during the transaction to be saved and made visible outside of the entity that performed the transaction.

As a part of processing database transactions, in various embodiments, database node 120 ensures that data is managed in accordance with the set of schemas described in metadata document 114. In particular, database store 110 may be a key-value store that does not provide support for strong typing; however, strong typing may still be desired by a client 121. As such, database node 120, in various embodiments, allows for a client 121 to define a framework for structuring and accessing data and then database node 120 enforces that framework, resulting in strong typing being provided. Thus, in various embodiments, database node 120 implements the schema management layer that was mentioned earlier. To potentially process transactions more efficiently, database node 120 can cache metadata document 114 in its in-memory cache 140, as shown.

In-memory cache 140, in various embodiments, is a buffer that stores data in memory (e.g., random access memory) of database node 120. In-memory cache 140 may be located in a shared memory area designated by an operation system executing on database node 120 and may be accessible to database processes (e.g., upgrade processes 137) of database node 120. Consequently, when processing a transaction request 122, database application 130 may access metadata document 114 from in-memory cache 140 and then process the requested transaction in view of metadata document 114. As discussed in greater detail with respect to FIG. 4, the metadata document 114 that is cached at in-memory cache 140 may be a different version than the one stored at database store 110. Accordingly, in various embodiments, database node 120 refreshes in-memory cache 140 to cache the latest metadata document 114 after a refresh period or in response to a transaction request 122.

In order to the create or update the schema(s) described within metadata document 114, a client 121 can send a schema request 126 to database node 120, as depicted. Schema request 126 may include a new metadata document 114 that is used to replace the metadata document stored at database store 110. The new metadata document 114 may define new database entities (e.g., an index) and/or update existing database entities (e.g., add a field to a table) described in the prior metadata document 114. In various embodiments, database node 120 supplements metadata documents 114 with status information that identifies the statuses of database entities described within those metadata documents 114. Accordingly, in some cases, a client 121 may issue a schema request 126 to determine the statuses of certain database entities. Database node 120 may send a schema response 128 to that client 121 that includes a metadata document 114 or an indication of the status of those database entities. Database node 120 may also provide a schema response 128 that identifies the version of the latest metadata document 114 to enable a client 121 to issue transaction requests 122 that utilize that metadata document 114 (e.g., by specifying a minimum version). After receiving a new metadata document 114, database node 120 may execute schema engine 135 to upgrade system 100 to comply with the new metadata document 114.

Schema engine 135, in various embodiments, facilitates the upgrade/migration of a set of records 112 to comply with a metadata document 114. As depicted, schema engine 135 can instantiate a set of upgrade processes 137. The upgrade processes 137, in various embodiments, walk through and upgrade records 112 that are associated with database entities that have been updated or created in a particular metadata document 114. For example, a metadata document 114 may describe a new index on a table and thus the upgrade processes 137 may walk through and process records 112 of that table to create the new index. As a part of processing a record 112, an upgrade process 137 may update the version of that record 112 to match the version of the particular metadata document 114. While the upgrade processes 137 are processing records 112, database node 120 may continue to service transaction requests 122.

In various cases, while the upgrade processes 137 are processing records 112, database node 120 may receive a transaction request 122 to perform operations on a certain set of records 112. Database node 120 may access those records 112 and determine that one or more of them have not yet been upgraded by the upgrade processes 137. In response, database node 120 may first upgrade the records 112 based on its cached metadata document 114 and then perform the requested operations on those records 112. An example of upgrading a record 112 as a part of a read/access request is discussed with respect to FIG. 3A and an example of upgrading a record 112 as a part of an update/write request is discussed with respect to FIG. 3B.

Figure 2:
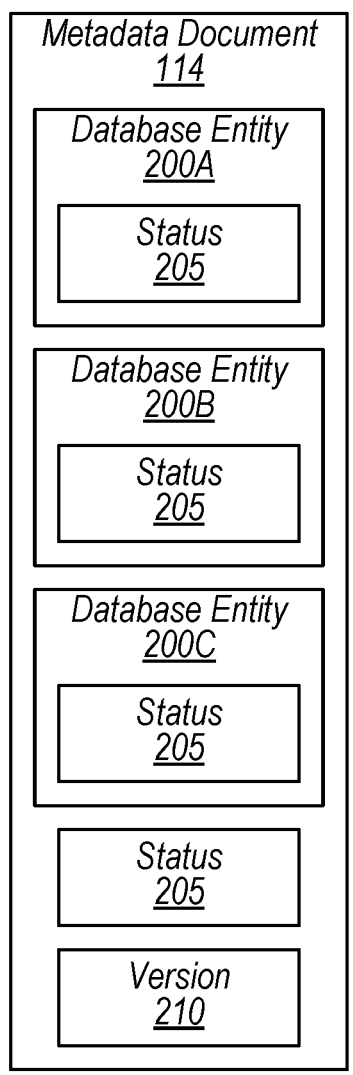
FIG. 2 is a block diagram illustrating example elements of a metadata document that describes a set of database entities, according to some embodiments.

Turning now to FIG. 2, a block diagram of a metadata document 114 is depicted. In the illustrated embodiment, metadata document 114 describes database entities 200A-C, a status 205, and a version 210. As depicted, database entities 200A-C each include a respective status 205. In some embodiments, metadata document 114 is implemented differently than shown. For example, database entities 200 may specify a version 210.

A database entity 200, in various embodiments, is a database construct or structure that facilitates the implementation of a database. For example, a database entity 200 may be a table, an index, a package, a procedure, a function, a trigger, a view, a sequence, or a link. A database entity 200 is formally defined in metadata document 114 and then created and managed based on that formal definition. Consequently, in various embodiments, to create or update a database entity 200, the new/updated database entity 200 is described in a metadata document 114 that is submitted to database node 120 via a schema request 126. The submitted metadata document 114 may replace an existing metadata document 114 at database store 110. Database node 120 may then implement the update/creation of the appropriate database entities 200. To track the current state of database entities 200, a database entity 200 can be associated with a status 205, as shown.

A status 205, in various embodiments, indicates the current state of an entity. Examples of states may include "creating," "updating," and "ready." A status 205 may be used by a client 121 to determine whether a database entity 200 can be used to process transaction requests 122 from the client 121. For example, a client 121 may submit a metadata document 114 describing a new view database entity 200 that is based on a set of tables. While that view database entity 200 is being created, its status 205 may be set to "creating" by database node 120. Accordingly, when the client 121 polls (e.g., via a schema request 126) database node 120 for the status 205, the client 121 determines that the view database entity 200 is not ready and thus may not submit transaction requests 122 that utilize the view database entity 200. When the client 121 observes that the status 205 has been set to "ready," then the client 121 may begin submitting transaction requests 122 that utilize the view database entity 200.

In various cases, a database entity 200 may depend on another database entity 200. For example, database entity 200A may correspond to a database table while database entity 200B may correspond to an index built based on that table. Accordingly, in some embodiments, the status 205 of a database entity 200 may be set in response to a change made to another database entity 200. For example, database entity 200C might correspond to a new index based on the table of database entity 200A. While that index is being built, the status 205 of database entity 200A may be set to "pending" to indicate that database entity 200A is in use. This may prevent database entity 200A from being deleted or its structure changed. Once that index is ready, the statuses 205 of database entities 200A and 200C may be set to "ready."

As shown, metadata document 114 includes a status 205. This status 205 may indicate whether all database entities 200 are ready or that there is at least one database entity 200 that is still being created or updated. In various embodiments, database entities 200 are created or updated at least partially in parallel by system 100. But in some embodiments, database entities 200 are created or updated serially. For example, metadata document 114 may describe a new field for database entity 200B and a new database entity 200C. Database node 120 may update the records 112 of database entity 200B before creating the physical database entity 200C. As a result, some database entities 200 might be ready for use before other database entities 200; the status 205 of metadata document 114 can be used to indicate when all database entities are ready.

As further illustrated, metadata document 114 includes a version 210. Version 210, in various embodiments, identifies a value indicative of the progression of metadata documents 114. Accordingly, the version 210 of a given metadata document 114 may be used to determine if that metadata document 114 is an earlier or later version of another metadata document 114. Version 210 may further enable a client 121 to ensure that particular database entities 200 are available for use in processing transaction requests 122. For example, a client 121 may specify a minimum schema version in a transaction request 122 and database node 120 may compare that minimum version to the version 210 of the metadata document 114 cached in in-memory cache 140.

Figure 3A:
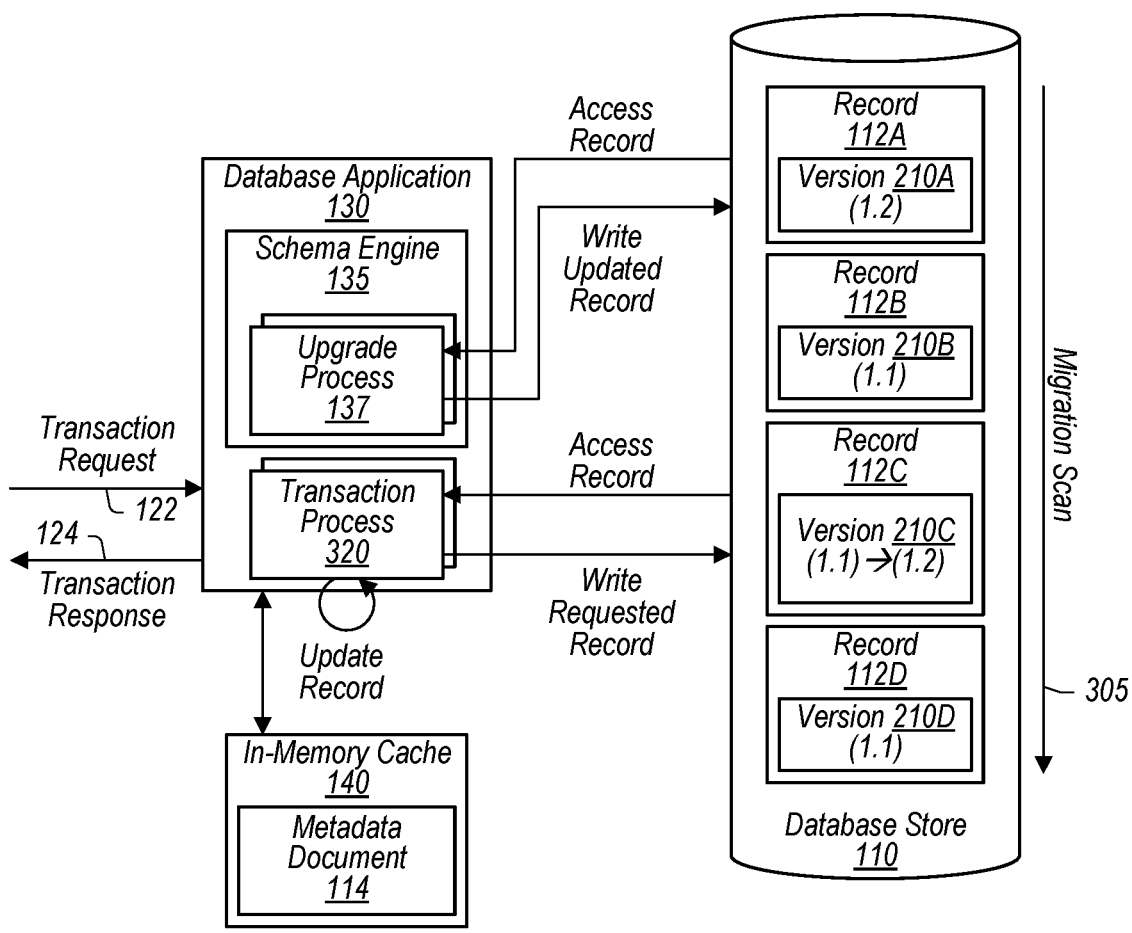
FIG. 3A is a block diagram illustrating example elements of a database application that processes a transaction that involves writing a record, according to some embodiments.

Turning now to FIG. 3A, a block diagram in which database application 130 processes a transaction that involves writing a record 112 is shown. In the illustrated embodiment, there is database store 110, database application 130, and in-memory cache 140. As shown, database store 110 includes a record 112A with a version 210A "1.2" and records 112B-D with versions 210B-D "1.1". As further shown, database application 130 includes transaction processes 320 and schema engine 135 that implements upgrade processes 137. Also as illustrated, in-memory cache 140 includes metadata document 114. The illustrated embodiment may be implemented differently than shown. As an example, there may be a metadata store that also stores metadata document 114.

As explained, database node 120 can receive a schema request 126 that specifies a new metadata document 114. In response to receiving that request, in various embodiments, schema engine 135 instantiates a set of upgrade processes 137 to perform a migration scan 305 on the records 112 that correspond to changes described in the new metadata document 114. In some cases, all records 112 stored within database store 110 are scanned as a part of that migration scan 305. In some embodiments, schema engine 135 may wait a period of time before initiating migration scan 305 so that in-memory cache 140 can be cleared. Records 112 that are scanned may be migrated to comply with the schema(s) described within the new metadata document 114.

As part of migration scan 305, in some embodiments, an upgrade process 137 performs an "on-disk" migration in which it accesses a record 112 (of a database entity 200 that is being upgraded) using the metadata corresponding to that record's version 210, upgrades the record 112 based on the metadata of the new metadata document 114, and then writes that record 112 back to database store 110. The read-write roundtrip might not be atomic as another concurrent write may occur after the record is read but before the record is written. Accordingly, in various embodiments, the writeback of the record is conditioned on the record being unmodified since the time it was accessed by the upgrade process 137. The condition may relate to attributes that are not present in the original record.

In some cases, the set of upgrade processes 137 might miss a record 112 that should be upgraded—e.g., a record 112 might be missed if database node 120 crashes. To ensure that all the relevant records 112 have been upgraded, in some embodiments, database node 120 spawns a set of scrutiny processes that traverse records 112 and migrate any records 112 that were not upgraded by upgrade process 137 but should have been. Scrutiny processes may be spawned periodically or after migration points have been reached (e.g., the completion of migration scan 305).

Transaction processes 320, in various embodiments, are computer processes executable to provide the various database services of database node 120. A transaction process 320 may be instantiated to handle a transaction request 122 passed in by a client 121 via an established database connection. As part of handling the transaction request, a transaction process 320 may execute a set of database statements specified in that request. In order to execute those database statements, in various embodiments, a transaction process 320 executes a query execution plan that defines a sequence of steps to be executed in order to fulfill the database statements. Thus, a transaction process 320 may access a definition for the query execution plan (e.g., at database 110), compile it into a form that can be executed by then transaction process 320, and thereafter execute the compiled form.

In various cases, while the set of upgrade processes 137 are performing migration scan 305, database application 130 may receive a transaction request 122 to perform a transaction that involves writing a record 112 to a database entity 200 that is being created or updated. As a result, in various embodiments, database application 130 ensures that the record 112 (which may be a new record or an update) complies with the metadata document 114 in its in-memory cache 140. As discussed in greater detail with respect to FIG. 4, database node 120 may refresh its in-memory cache 140 periodically so that it stores the latest metadata document 114. In the case that the record 112 to be written is a new record, database node 120 may write that record 112 to database store 110 in accordance with the cached metadata document 114.

In the case that the record 112 to be written is an update, a transaction process 320 may access the existing record 112. For example, the transaction request 122 may provide an update to record 112C and thus the transaction process 320 may access record 112C, as shown. If the version 210 of the accessed record 112 matches the version of the metadata document 114 that is cached in in-memory cache 140, then the transaction process 320 writes the updated record 112 to database store 110. If there is a discrepancy between the versions, then the transaction process 320 may perform a set of steps to upgrade the existing record 112 to the version of the metadata document 114. For example, if the metadata document 114 adds a field to a database table that includes the accessed record 112, then the transaction process 320 may upgrade the record 112 to include a value for the field. In some embodiments, the transaction process 320 writes the upgrade record 112 back to database store 110 and then retries the request. In other embodiments, the transaction process 320 writes the requested update to the upgraded record 112 and writes that record 112 to database store 110. In various embodiments, the transaction process 320 further updates the version of the record 112. For example, when record 112C is originally accessed, its version 210C is "1.1" (as it may have not been upgraded yet by the set of upgrade processes 137) but the version of the cached metadata document 114 may be "1.2". As such, a transaction process 320 may upgrade record 112C to version "1.2" and then perform the requested operation on the upgraded record 112C.

Other database operations that are conditional (e.g., delete the record 112 if its property "foo" value equals "blah") may involve upgrading a record 112 before performing the database operation. As an example, a metadata document 114 may add a field "foo" to a database table and a database application 130 may receive a request to delete any record 112 of that database table where the value of "foo" is "blah." If a record 112 has not been upgraded so that it has a value for that field, then, in various embodiments, database application 130 upgrades the record 112 to have a value for that field so that the delete operation can be implemented. The replace operation in which a certain record 112 is replaced with another record 112 is another example of a database operation that may be conditional and thus can involve upgrading a record 112. In some embodiments, if the requested operation is not conditional, then database application 130 may perform the requested operation without upgrading the associated record 112. Instead, the set of upgrade processes 137 may upgrade the record 112 upon reaching it during migration scan 305.

Figure 3B:
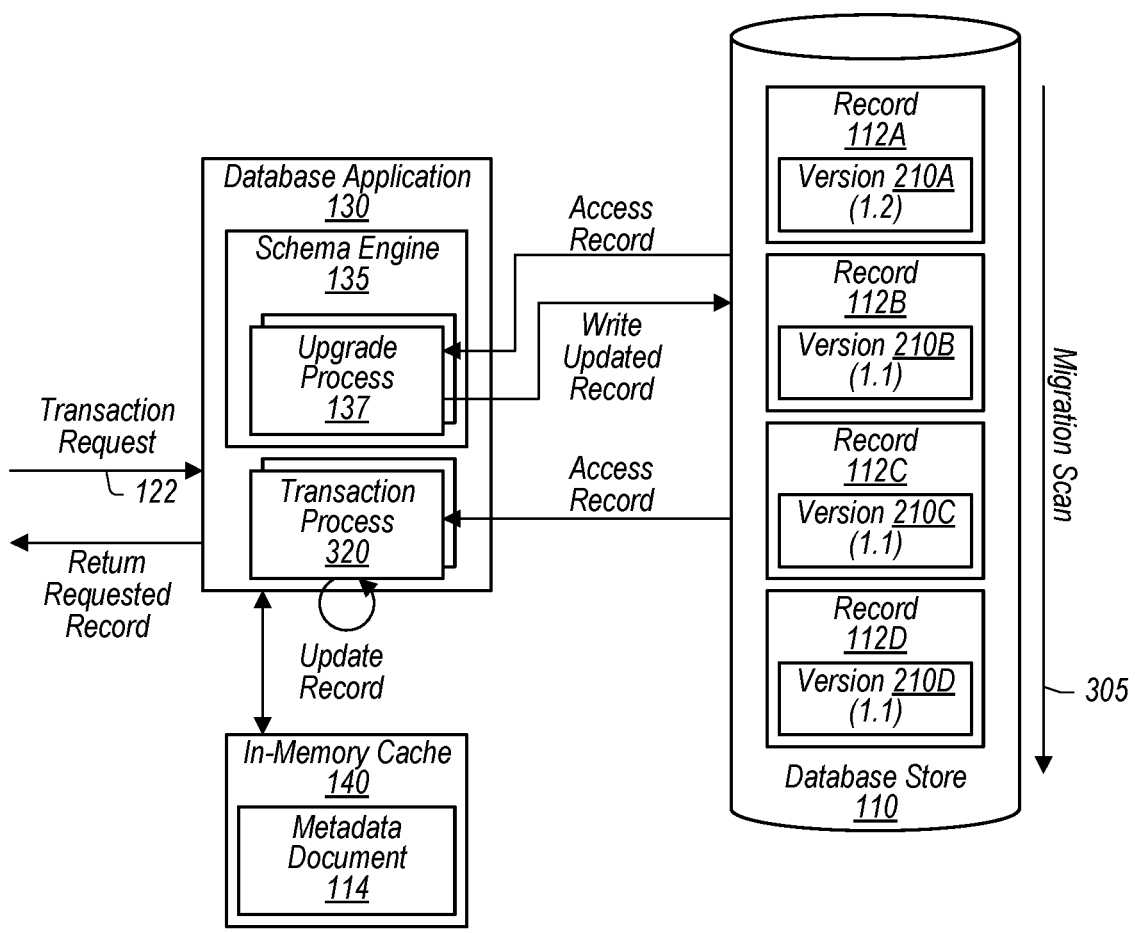
FIG. 3B is a block diagram illustrating example elements of a database application that processes a transaction that involves returning a record, according to some embodiments.

Turning now to FIG. 3B, a block diagram in which database application 130 processes a transaction that involves returning a record 112 is shown. In the illustrated embodiment, there is database store 110, database application 130, and in-memory cache 140. As shown, database store 110 includes a record 112A with a version 210A "1.2" and records 112B-D with versions 210B-D "1.1". As further shown, database application 130 includes transaction processes 320 and schema engine 135 that implements upgrade processes 137. Also as illustrated, in-memory cache 140 includes metadata document 114. The illustrated embodiment may be implemented differently than shown. As an example, there may be a metadata store that also stores metadata document 114.

In some cases, database application 130 receives a transaction request 122 to return one or more records 112 stored at database store 110. Similar to writing a record 112, a transaction process 320 may access a record 112, determine whether its version 210 is the same as version of the cached metadata document 114, and then upgrade the record 112 (if applicable) prior to returning record 112 to the requestor. Instead of performing an "on-disk" migration, in various embodiments, a transaction process 320 performs an "in-memory" migration in which a record 112 is upgraded but not written back to database store 110. For example, record 112C may be accessed and upgraded at database application 130 in order to comply with the cached metadata document 114 but may not be written to database store 110; rather, the set of upgrade processes 137 may perform the on-disk migration in which record 112C is upgraded and written to database store 110. In some embodiments, however, the transaction process 320 may upgrade a record 112, return it to the requestor (e.g., via a transaction response 124), and then write it to database store 110.

Figure 4:
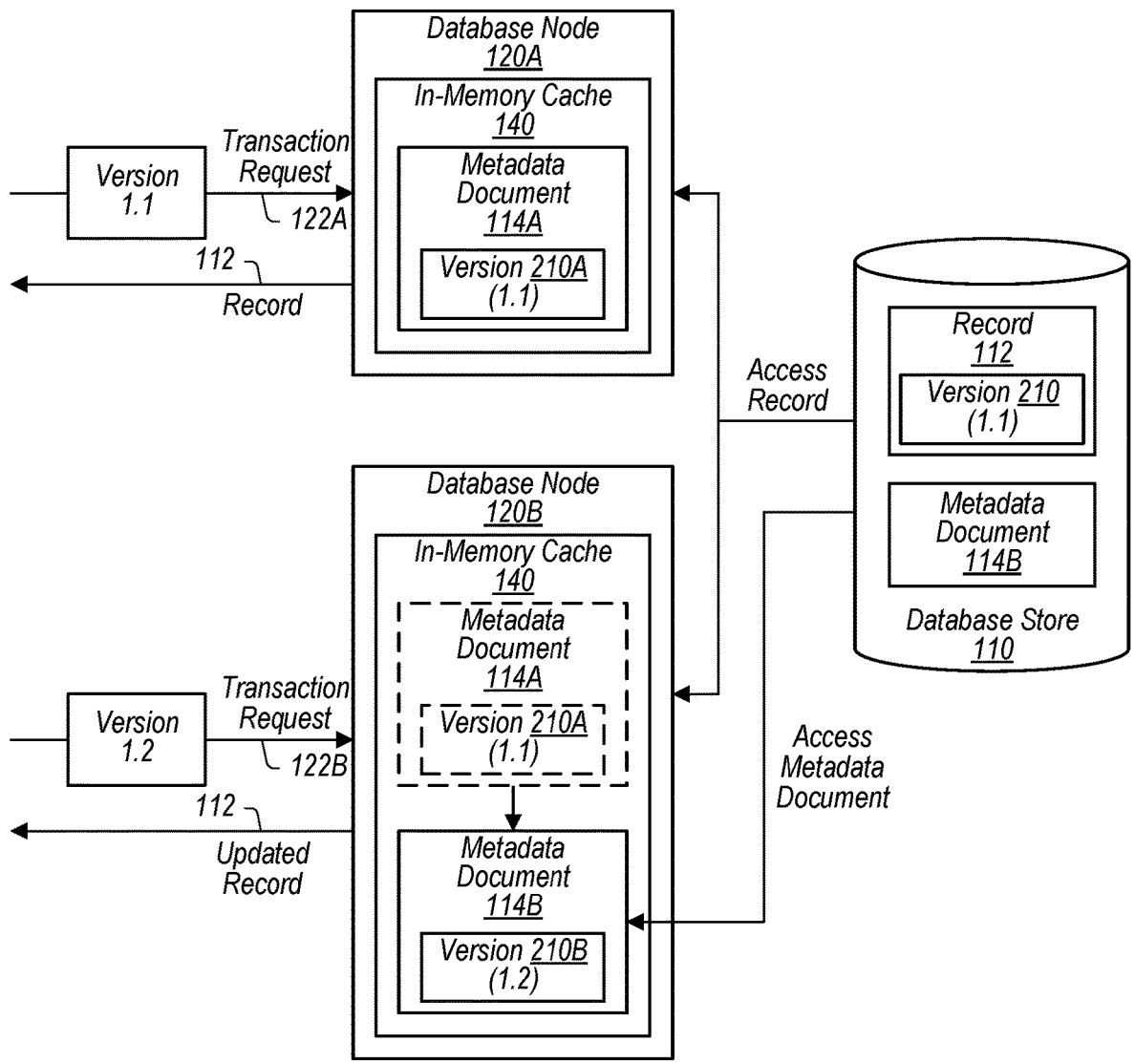
FIG. 4 is a block diagram illustrating example elements of a database node capable of refreshing its cache to store an updated metadata document, according to some embodiments.

Turning now to FIG. 4, a block diagram of a database node 120 refreshing its in-memory cache 140 to store an updated metadata document 114 is shown. In the illustrated embodiment, there are two database nodes 120A-B and database store 110. As depicted, both database nodes 120A-B initially cache a metadata document 114A having a version 210A "1.1", and database store 110 stores a metadata document 114B having a version 210B "1.2". As further shown, database store 110 stores a record 112 having a version 210 "1.1". The illustrated embodiment may be implemented differently than shown. For example, there may not be two database nodes 120A-B.

As discussed, in some embodiments, a database node 120 can receive a schema request 126 that includes an updated metadata document 114. But in various embodiments, a metadata endpoint is provided at which the updated metadata document 114 can be submitted and stored by a metadata server (not shown). As a result, the metadata documents 114 cached at database nodes 120 might temporarily be an older version than the metadata document 114 that is stored at database store 110. As discussed, a database node 120 may process a transaction request 122 in accordance with the metadata document 114 within its in-memory cache 140. Consequently, a transaction request 122 may be processed in accordance with a metadata document 114 that is associated with an older version.

In various embodiments, to ensure that database nodes 120 use at least a certain version, clients 121 can specify a minimum schema version in their transaction requests 122. As shown, for example, transaction request 122A specifies a minimum schema version of "1.1". Because metadata document 114A has a version 210A "1.1", database node 120A may not fresh its in-memory cache 140 but instead may process transaction request 122A using metadata document 114A. Accordingly, if transaction request 122A seeks to access the illustrated record 112, then database node 120A may access record 112, determine that its version 210 matches the version of metadata document 114A, and then return record 112 without upgrading that record 112. In contrast to transaction request 122A, transaction request 122B specifies a minimum version of "1.2". Since metadata document 114A stored at database node 120B is less than the minimum version, database node 120B accesses metadata document 114B and replaces, in its-in-memory cache 140, metadata document 114A with metadata document 114B.

Database node 120B may then process transaction request 122B. If transaction request 122B seeks to access record 112, then database node 120B may access record 112, determine that its version 210 is different than the version of metadata document 114B, and then upgrade record 112 to version "1.2". Thereafter, database node 120B may return the upgraded record 112 to the requestor and/or write that record 112 back to database store 110. Thus, a client 121 may force a database node 120 to use at least a minimum metadata document version. In order to determine the latest metadata document version, in various embodiments, a client 121 issues a schema request 126 to a database node 120 or a metadata server to access the latest metadata document 114. That metadata document 114 may be return to the client 121, which may extract the version 210 of that metadata document 114 and then include that version 210 in subsequent transaction requests 122 to a database node 120.

Figure 5:
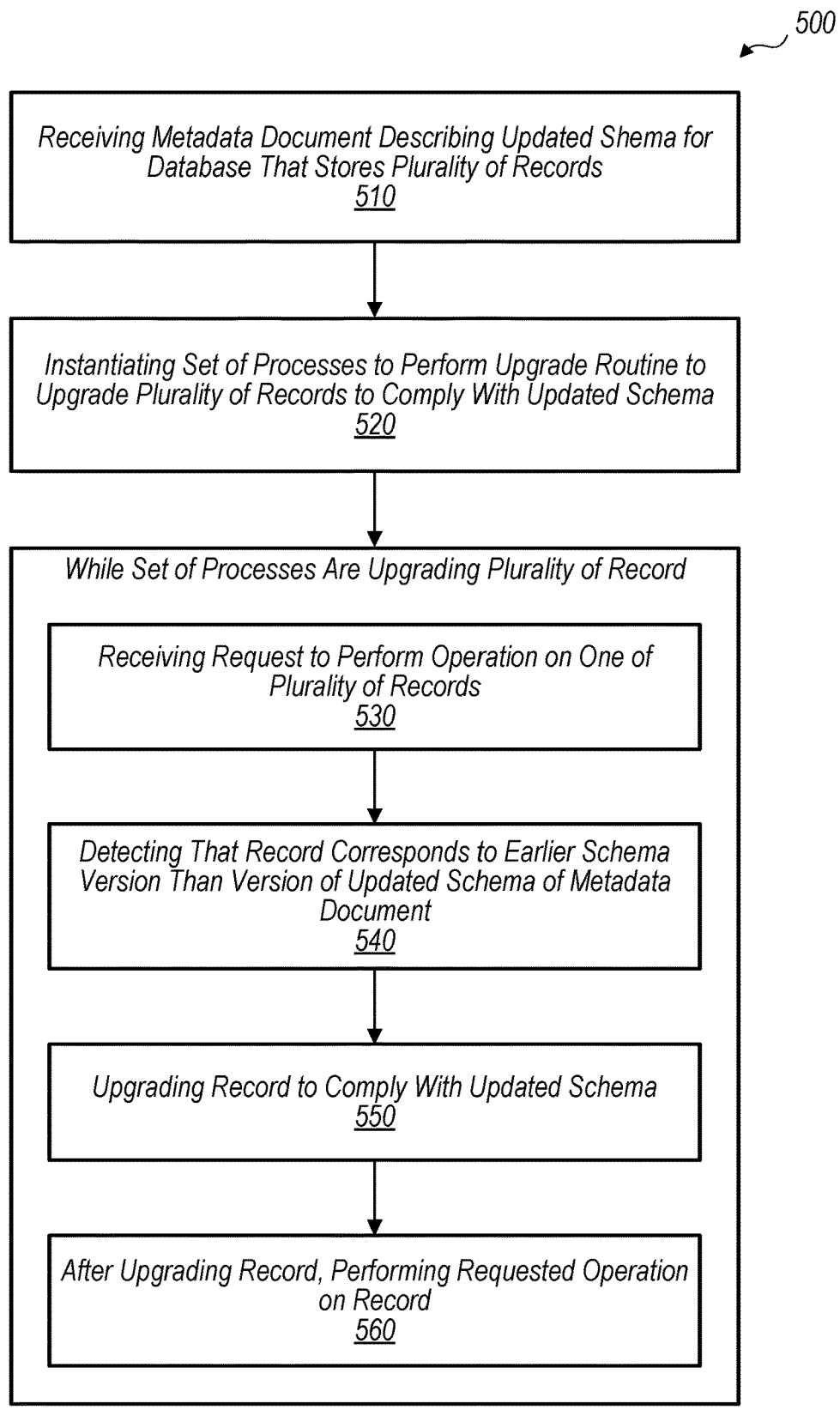
FIGS. 5-6 are flow diagrams illustrating example methods relating to upgrading a record as part of processing a transaction, according to some embodiments.

Turning now to FIG. 5, a flow diagram of a method 500 is shown. Method 500 is one embodiment of a method performed by a computer system (e.g., system 100) in which a set of records (e.g., records 112) are upgraded as part of processing a transaction. Method 500 may be performed by executing a set of program instructions stored on a non-transitory computer-readable medium. In some embodiments, method 500 includes more or less steps than shown. For example, method 500 may include a step in which the computer system writes an upgraded record to a database (e.g., database store 110).

Method 500 begins in step 510 with the computer system receiving (e.g., from a client 121) a metadata document (e.g., a metadata document 114) describing an updated schema for a database that stores a plurality of records. The updated schema may describe a set of database entities (e.g., database entities 200) and a corresponding set of statuses (e.g., statuses 205). A status of the set of statuses, in various embodiments, indicates whether a corresponding entity is usable to process a request (e.g., a transaction request 122). In response to receiving a status request (e.g., a schema request 126) from a client (e.g., a client 121) for a status of a particular one of the set of database entities, the computer system may return a response (e.g., a schema response 128) indicating the status of that particular database entity. In various embodiments, the client is operable to use the response to determine whether the particular database entity can be used to process requests from the client.

In step 520, the computer system instantiates a set of processes (e.g., upgrade processes 137) to perform an upgrade routine to upgrade the plurality of records to comply with the updated schema. The updated schema may describe a set of updates to a set of database entities and a first one of the set of database entities may be migrated before a second one of the set of database entities such that the first database entity is available for use in processing requests before the second database entity is available.

In step 530, while the set of processes are upgrading the plurality of records, the computer system receives a request (e.g., a transaction request 122) to perform an operation on one of the plurality of records. The request may specify multiple operations and/or multiple records. In some embodiments, the request specifies a minimum schema version to be used in processing the received request. The computer system may detect that a schema that is stored in a memory (e.g., in-memory cache 140) of the computer system does not satisfy the minimum schema version. As such, the computer system may replace, in the memory, the stored schema with the updated schema.

In step 540, the computer system detects that the record corresponds to an earlier schema version than a version of the updated schema of the metadata document. In step 550, the computer system upgrades the record to comply with the updated schema. In some cases, one of the set of database entities may be an index and the computer system may update, within the metadata document, a status of a table on which that index is based. The updated status of the table may prevent the table from being deleted while the index is being created. In some cases, the updated schema may describe an index not described in the earlier schema version. Accordingly, upgrading the record to comply with the updated schema may include populating the index with an entry for the record and after populating the index with the entry, updating a version (e.g., a version 210) of the record to match the version of the updated schema.

In step 560, after upgrading the record, the computer system performs the requested operation on the record. In some cases, the record may be upgraded and returned to an issuer of the request without being stored in the database. As such, the record may be subsequently upgraded by one of the set of processes and stored in the database. After the set of processes complete the upgrade routine, in some embodiments, the computer system instantiates a set of scrutiny processes to determine whether all of the plurality of records have been upgraded to comply with the updated schema.

Figure 6:
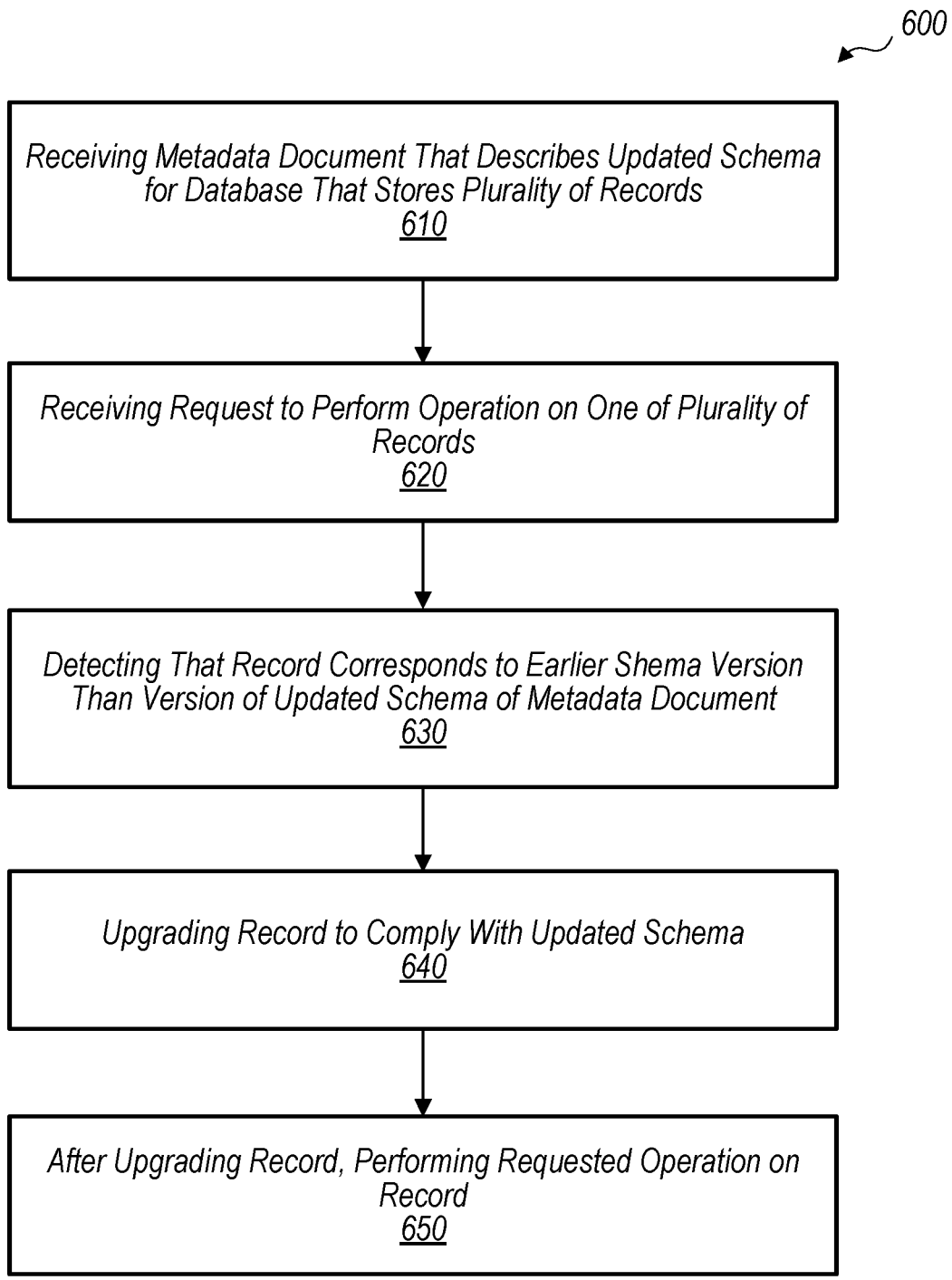

Turning now to FIG. 6, a flow diagram of a method 600 is shown. Method 600 is one embodiment of a method performed by a computer system (e.g., system 100) in which a set of records (e.g., records 112) are upgraded as part of processing a transaction. Method 600 may be performed by executing a set of program instructions stored on a non-transitory computer-readable medium. In some embodiments, method 600 includes more or less steps than shown. For example, method 600 may include a step in which the computer system writes an upgraded record to a database (e.g., database store 110).

Method 600 begins in step 610 with the computer system receiving a metadata document (e.g., metadata document 114) describing an updated schema for a database that stores a plurality of records. In various embodiments, the computer system instantiates a set of processes (e.g., upgrade processes 137) to perform an upgrade routine to upgrade the plurality of records to comply with the updated schema. The updated schema may describe a set of database entities (e.g., database entities 200) and a corresponding set of statuses (e.g., statuses 205). The computer system may set, for one of the set of database entities, a status of the database entity to indicate that the database entity is being upgraded. In some embodiments, the status is observable by clients that are operable to issue database requests to the system.

In step 620, the computer system receives a request (e.g., a transaction request 122) to perform an operation on one of the plurality of records. The request may specify a minimum schema version and the computer system may determine that the version of the schema cached in a cache (e.g., in-memory 140) of the system is less than the minimum schema version and then may replace, in the cache, the cached schema with the updated schema In step 630, the computer system detects that the record corresponds to an earlier schema version than a version of the updated schema of the metadata document. In step 640, the computer system upgrades the record to comply with the updated schema. In some cases, the updated schema adds an additional field to a database table of the database. The record may correspond to the table and thus updating the record may include modifying the record to include a value for the additional field and updating a version (e.g., version 210) of the record to match the version of the updated schema.

In step 650, after upgrading the record, the computer system performs the requested operation on the record. In some cases, performing the requested operation includes deleting the upgraded record from the database. The computer system may receive another request to perform an operation on a different one of the plurality of records. The other request may not specify a minimum schema version. Prior to refreshing its cache with the updated schema, the computer system may perform the operation of the other request on the different record without upgrading the different record, which may correspond to an earlier schema version than the version of the updated schema.

Exemplary Multi-Tenant Database System

Figure 7:
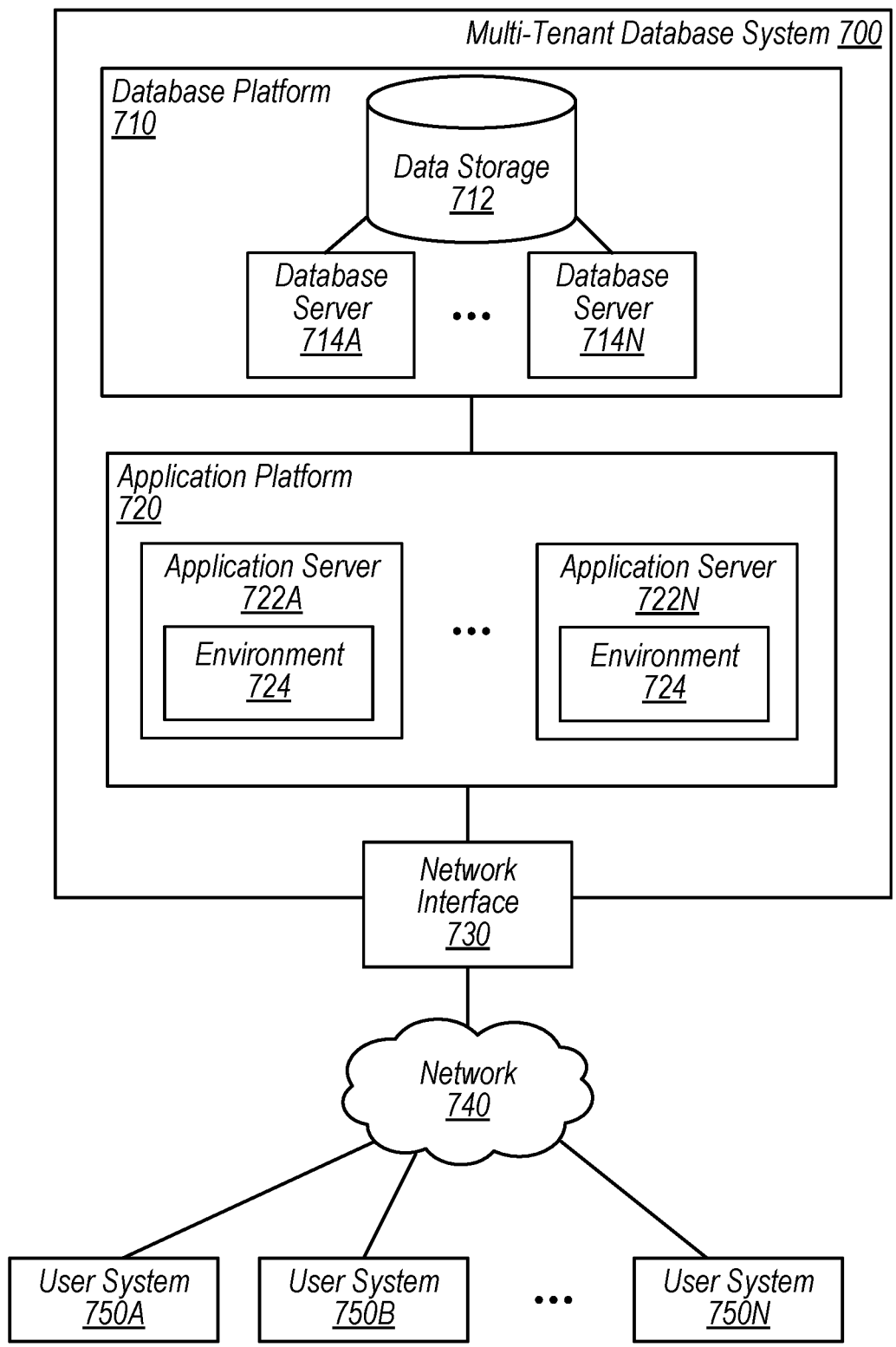
FIG. 7 is a block diagram illustrating elements of a multi-tenant system, according to some embodiments.

Turning now to FIG. 7, an exemplary multi-tenant database system (MTS) 700 in which various techniques of the present disclosure can be implemented is shown—e.g., system 100 may be MTS 700. In FIG. 7, MTS 700 includes a database platform 710, an application platform 720, and a network interface 730 connected to a network 740. Also as shown, database platform 710 includes a data storage 712 and a set of database servers 714A-N that interact with data storage 712, and application platform 720 includes a set of application servers 722A-N having respective environments 724. In the illustrated embodiment, MTS 700 is connected to various user systems 750A-N through network 740. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 700, in various embodiments, is a set of computer systems that together provide various services to users (alternatively referred to as "tenants") that interact with MTS 700. In some embodiments, MTS 700 implements a customer relationship management (CRM) system that provides mechanism for tenants (e.g., companies, government bodies, etc.) to manage their relationships and interactions with customers and potential customers. For example, MTS 700 might enable tenants to store customer contact information (e.g., a customer's website, email address, telephone number, and social media data), identify sales opportunities, record service issues, and manage marketing campaigns. Furthermore, MTS 700 may enable those tenants to identify how customers have been communicated with, what the customers have bought, when the customers last purchased items, and what the customers paid. To provide the services of a CRM system and/or other services, as shown, MTS 700 includes a database platform 710 and an application platform 720.

Database platform 710, in various embodiments, is a combination of hardware elements and software routines that implement database services for storing and managing data of MTS 700, including tenant data. As shown, database platform 710 includes data storage 712. Data storage 712, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 712 is used to implement a database (e.g., database store 110) comprising a collection of information that is organized in a way that allows for access, storage, and manipulation of the information. Data storage 712 may implement a single database, a distributed database, a collection of distributed databases, a database with redundant online or offline backups or other redundancies, etc. As part of implementing the database, data storage 712 may store files that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 700 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 712 is organized as part of a log-structured merge-tree (LSM tree). An LSM tree normally includes two high-level components: an in-memory buffer and a persistent storage. In operation, a database server 714 may initially write database records into a local in-memory buffer before later flushing those records to the persistent storage (e.g., data storage 712). As part of flushing database records, the database server 714 may write the database records into new files that are included in a "top" level of the LSM tree. Over time, the database records may be rewritten by database servers 714 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 712.

When a database server 714 wishes to access a database record for a particular key, the database server 714 may traverse the different levels of the LSM tree for files that potentially include a database record for that particular key. If the database server 714 determines that a file may include a relevant database record, the database server 714 may fetch the file from data storage 712 into a memory of the database server 714. The database server 714 may then check the fetched file for a database record having the particular key. In various embodiments, database records are immutable once written to data storage 712. Accordingly, if the database server 714 wishes to modify the value of a row of a table (which may be identified from the accessed database record), the database server 714 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 714, in various embodiments, are hardware elements, software routines, or a combination thereof capable of providing database services, such as data storage, data retrieval, and/or data manipulation. A database server 714 may correspond to database node 120. Such database services may be provided by database servers 714 to components (e.g., application servers 722) within MTS 700 and to components external to MTS 700. As an example, a database server 714 may receive a database transaction request from an application server 722 that is requesting data to be written to or read from data storage 712. The database transaction request may specify an SQL SELECT command to select one or more rows from one or more database tables. The contents of a row may be defined in a database record and thus database server 714 may locate and return one or more database records that correspond to the selected one or more table rows. In various cases, the database transaction request may instruct database server 714 to write one or more database records for the LSM tree-database servers 714 maintain the LSM tree implemented on database platform 710. In some embodiments, database servers 714 implement a relational database management system (RDMS) or object oriented database management system (OODBMS) that facilitates storage and retrieval of information against data storage 712. In various cases, database servers 714 may communicate with each other to facilitate the processing of transactions. For example, database server 714A may communicate with database server 714N to determine if database server 714N has written a database record into its in-memory buffer for a particular key.

Application platform 720, in various embodiments, is a combination of hardware elements and software routines that implement and execute CRM software applications as well as provide related data, code, forms, web pages and other information to and from user systems 750 and store related data, objects, web page content, and other tenant information via database platform 710. In order to facilitate these services, in various embodiments, application platform 720 communicates with database platform 710 to store, access, and manipulate data. In some instances, application platform 720 may communicate with database platform 710 via different network connections. For example, one application server 722 may be coupled via a local area network and another application server 722 may be coupled via a direct network link. Transfer Control Protocol and Internet Protocol (TCP/IP) are exemplary protocols for communicating between application platform 720 and database platform 710, however, it will be apparent to those skilled in the art that other transport protocols may be used depending on the network interconnect used.

Application servers 722, in various embodiments, are hardware elements, software routines, or a combination thereof capable of providing services of application platform 720, including processing requests received from tenants of MTS 700. Application servers 722, in various embodiments, can spawn environments 724 that are usable for various purposes, such as providing functionality for developers to develop, execute, and manage applications (e.g., business logic). Data may be transferred into an environment 724 from another environment 724 and/or from database platform 710. In some cases, environments 724 cannot access data from other environments 724 unless such data is expressly shared. In some embodiments, multiple environments 724 can be associated with a single tenant.

Application platform 720 may provide user systems 750 access to multiple, different hosted (standard and/or custom) applications, including a CRM application and/or applications developed by tenants. In various embodiments, application platform 720 may manage creation of the applications, testing of the applications, storage of the applications into database objects at data storage 712, execution of the applications in an environment 724 (e.g., a virtual machine of a process space), or any combination thereof. In some embodiments, application platform 720 may add and remove application servers 722 from a server pool at any time for any reason, there may be no server affinity for a user and/or organization to a specific application server 722. In some embodiments, an interface system (not shown) implementing a load balancing function (e.g., an F5 Big-IP load balancer) is located between the application servers 722 and the user systems 750 and is configured to distribute requests to the application servers 722. In some embodiments, the load balancer uses a least connections algorithm to route user requests to the application servers 722. Other examples of load balancing algorithms, such as are round robin and observed response time, also can be used. For example, in certain embodiments, three consecutive requests from the same user could hit three different servers 722, and three requests from different users could hit the same server 722.

In some embodiments, MTS 700 provides security mechanisms, such as encryption, to keep each tenant's data separate unless the data is shared. If more than one server 714 or 722 is used, they may be located in close proximity to one another (e.g., in a server farm located in a single building or campus), or they may be distributed at locations remote from one another (e.g., one or more servers 714 located in city A and one or more servers 722 located in city B). Accordingly, MTS 700 may include one or more logically and/or physically connected servers distributed locally or across one or more geographic locations.

One or more users (e.g., via user systems 750) may interact with MTS 700 via network 740. User system 750 may correspond to, for example, a tenant of MTS 700, a provider (e.g., an administrator) of MTS 700, or a third party. Each user system 750 may be a desktop personal computer, workstation, laptop, PDA, cell phone, or any Wireless Access Protocol (WAP) enabled device or any other computing device capable of interfacing directly or indirectly to the Internet or other network connection. User system 750 may include dedicated hardware configured to interface with MTS 700 over network 740. User system 750 may execute a graphical user interface (GUI) corresponding to MTS 700, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 750 to access, process, and view information and pages available to it from MTS 700 over network 740. Each user system 750 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 700 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 750 may be users in differing capacities, the capacity of a particular user system 750 might be determined one or more permission levels associated with the current user. For example, when a salesperson is using a particular user system 750 to interact with MTS 700, that user system 750 may have capacities (e.g., user privileges) allotted to that salesperson. But when an administrator is using the same user system 750 to interact with MTS 700, the user system 750 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 700 that are allocated at the tenant level while other data structures are managed at the user level.

In some embodiments, a user system 750 and its components are configurable using applications, such as a browser, that include computer code executable on one or more processing elements. Similarly, in some embodiments, MTS 700 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 740 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 750 may communicate with MTS 700 using TCP/IP and, at a higher network level, use other common Internet protocols to communicate, such as HTTP, FTP, AFS, WAP, etc. For example, where HTTP is used, user system 750 might include an HTTP client commonly referred to as a "browser" for sending and receiving HTTP messages from an HTTP server at MTS 700. Such a server might be implemented as the sole network interface between MTS 700 and network 740, but other techniques might be used as well or instead. In some implementations, the interface between MTS 700 and network 740 includes load sharing functionality, such as round-robin HTTP request distributors to balance loads and distribute incoming HTTP requests evenly over a plurality of servers.

In various embodiments, user systems 750 communicate with application servers 722 to request and update system-level and tenant-level data from MTS 700 that may require one or more queries to data storage 712. In some embodiments, MTS 700 automatically generates one or more SQL statements (the SQL query) designed to access the desired information. In some cases, user systems 750 may generate requests having a specific format corresponding to at least a portion of MTS 700. As an example, user systems 750 may request to move data objects into a particular environment 724 using an object notation that describes an object relationship mapping (e.g., a JavaScript object notation mapping) of the specified plurality of objects.

Exemplary Computer System

Figure 8:
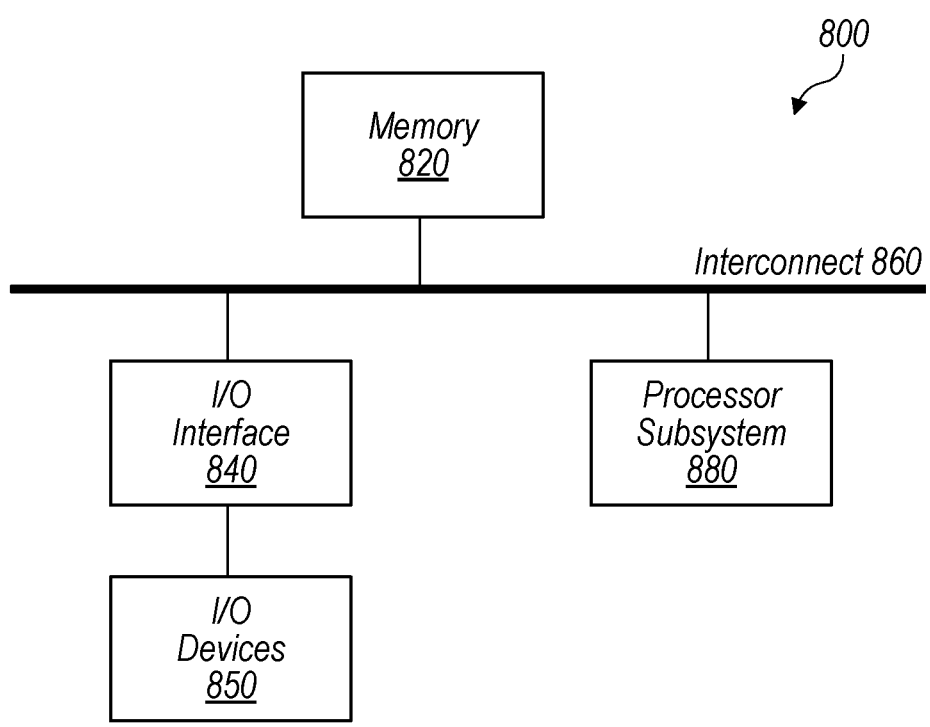
FIG. 8 is a block diagram illustrating elements of a computer system for implementing various systems described in the present disclosure, according to some embodiments.

Turning now to FIG. 8, a block diagram of an exemplary computer system 800, which may implement system 100, database store 110, database node 120, MTS 700, and/or user system 750, is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement database application 130 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
   receiving, by a computer system, a metadata document describing an updated schema for a database that stores a plurality of records, wherein the updated schema describes a set of database entities and a corresponding set of statuses, and wherein a status of the set of statuses indicates whether a corresponding database entity can be used to process requests;
   instantiating, by the computer system, a set of processes to perform an upgrade routine to upgrade the plurality of records to comply with the updated schema;
   while the set of processes are upgrading the plurality of records, the computer system:
      receiving, from a client, a request to perform an operation on one of the plurality of records;
      detecting that the record corresponds to an earlier schema version than a version of the updated schema of the metadata document;
      upgrading the record to comply with the updated schema; and
      after upgrading the record, performing the requested operation on the record; and
   in response to receiving a status request from the client for a status of a particular one of the set of database entities, the computer system returning a response indicating the status of the particular database entity that causes the client to determine that the particular database entity is usable to process requests from the client.

2. The method of claim 1, wherein one of the set of database entities is an index, wherein the method further comprises:
   updating, within the metadata document by the computer system, a status of a table on which the index is based, wherein the updated status of the table prevents the table from being deleted while the index is being created.

3. The method of claim 1, wherein the updated schema describes an index not described in the earlier schema version, and wherein upgrading the record to comply with the updated schema includes:
   populating the index with an entry for the record; and
   after populating the index with the entry, updating a version of the record to match the version of the updated schema.

4. The method of claim 1, wherein the request specifies a minimum schema version to be used in processing the received request, and wherein the method further comprises:
   detecting, by the computer system, that a schema stored in a memory of the computer system does not satisfy the minimum schema version specified by the request; and
   replacing, in the memory, the stored schema with the updated schema.

5. The method of claim 1, wherein the updated schema describes a set of updates to a set of database entities, and wherein a first one of the set of database entities is migrated before a second one of the set of database entities such that the first database entity is available for use before the second database entity.

6. The method of claim 1, wherein the record is upgraded and returned to an issuer of the request without being stored in the database, and wherein the record is subsequently upgraded by one of the set of processes and stored in the database.

7. The method of claim 1, further comprising:
   subsequent to the set of processes performing the upgrade routine, the computer system instantiating a set of scrutiny processes to determine whether all of the plurality of records have been upgraded to comply with the updated schema.

8. A non-transitory computer readable medium having program instructions stored thereon that are executable by a computer system to cause the computer system to perform operations comprising:
- receiving a metadata document describing an updated schema for a database that stores a plurality of records;
- instantiating a set of processes to perform an upgrade routine to upgrade the plurality of records to comply with the updated schema; and
- receiving, from a client, a first request to perform an operation on one of the plurality of records;
- detecting that the record corresponds to an earlier schema version than a version of the updated schema of the metadata document;
- upgrading the record to comply with the updated schema;
- after upgrading the record, performing the requested operation on the record;
- in response to upgrading records associated with a database entity, updating a status of the database entity to indicate that the database entity can be used in processing requests;
- in response to receiving a second request from the client for the status of the database entity associated with the updated schema, returning a response indicating the status of the database entity to enable the client to determine whether the database entity is usable to process requests from the client; and
- in response to the client determining that the database entity has a ready status, receiving a third request from the client to perform an operation with respect to the database entity.

9. The medium of claim 8, wherein the first request specifies a minimum schema version to be used in processing the first request, and wherein the operations further comprise:
- detecting that a schema cached in an in-memory cache of the computer system does not satisfy the minimum schema version; and
- replacing, in the in-memory cache, the cached schema with the updated schema.

10. The medium of claim 8, wherein the operations further comprise:
- receiving another request to perform an operation on a different one of the plurality of records, wherein the other request does not specify a minimum schema version; and
- performing the operation of the other request on the different record without upgrading the different record, wherein the different record corresponds to an earlier schema version than the version of the updated schema.

11. The medium of claim 8, wherein performing the requested operation includes deleting the upgraded record from the database.

12. The medium of claim 8, wherein the operations further comprise:
- subsequent to the set of processes performing the upgrade routine, instantiating a set of scrutiny processes to determine whether ones of the plurality of records have been upgraded to comply with the updated schema.

13. A system, comprising:
- at least one processor; and
- memory having program instructions stored thereon that are executable by the at least one process to cause the system to perform operations comprising:
  - receiving a metadata document that describes an updated schema for a database that stores a plurality of records, wherein the updated schema describes a set of database entities and a corresponding set of statuses;
  - receiving, from a client, a first request to perform an operation on one of the plurality of records;
  - detecting that the record corresponds to an earlier schema version than a version of the updated schema of the metadata document;
  - upgrading the record to comply with the updated schema;
  - after upgrading the record, performing the requested operation on the record;
  - in response to receiving a second request from the client for a status of a database entity associated with the updated schema, returning a response indicating the status of the database entity to allow the client to determine whether the database entity is usable to process requests from the client;
  - setting, when upgrading the database entity, the status of the database entity to indicate that the database entity is being upgraded; and
  - after the database entity has a ready status, receiving a third request from the client to perform an operation with respect to the database entity.

14. The system of claim 13, wherein the first request specifies a minimum schema version, and wherein the operations further comprise:
- determining that a version of a schema for the database that is cached in a cache of the system is less than the minimum schema version; and
- replacing, in the cache, the cached schema with the updated schema.

15. The system of claim 13, wherein the updated schema adds an additional field to a table of the database, wherein the record corresponds to the table, and wherein updating the record includes:
- modifying the record to include a value for the additional field; and
- updating a version of the record to match the version of the updated schema.

16. The system of claim 13, wherein the operations further comprise:
- instantiating a set of processes to perform an upgrade routine to upgrade the plurality of records to comply with the updated schema.

* * * * *